Patented July 6, 1937

2,086,506

UNITED STATES PATENT OFFICE 2,086,506

SPLINTERLESS MATERIALS, PARTICULARLY SPLINTERLESS GLASS

Georg Kränzlein, Frankfort - on - the - Main - Hochst, Germany, assignor to I. G. Farbenindustrie Aktiengesellschaft, Frankfort-on-the-Main, Germany.

No Drawing. Application April 16, 1931, Serial No. 530,733. In Germany April 17, 1930

3 Claims. (Cl. 49—92)

The present invention relates to splinterless materials particularly to splinterless glass.

I have found that splinterless materials can easily be made from inorganic fused masses of all kinds, by treating said masses with the products obtainable by the polymerization of mixture of unsaturated organic compounds capable of being polymerized. There may be used, for instance, polymerized products obtained by mixing and polymerizing vinyl esters with each other or by mixing and polymerizing vinyl esters with other substances capable of being polymerized. These polymerization products possess a high elasticity and the safety glass prepared therewith is extremely resistant to shocks.

The polymerized products obtained by polymerizing vinyl esters and acrylic acid esters have been found to be particularly useful; furthermore there may be used polymerized products obtained by mixing and polymerizing vinyl acetate and vinyl chloroacetate, vinyl acetate and vinyl benzoate, vinyl acetate and butadiene, vinyl benzoate and isoprene, vinyl ethyl ether and acroleine, styrene and acroleine, styrene and cinnamic methyl ester.

Furthermore I have found that there may be added to the unsaturated organic substances polymerized either alone or in mixture with each other the adhesive to gummous reaction products obtainable by a more or less advanced reaction between polybasic organic acids and organic compounds containing at least one hydroxyl group and preferably at least three carbon atoms, such as the condensation products of maleic anhydride, phthalic acid, citric acid and the like with butylene glycol, castor oil, glycerin, sorbite and the like. By the addition of these substances to polymerization products especially of compounds containing the group

$$H_2C=C<$$

and of mixtures thereof, splinterless materials can be made, showing an improved elasticity, adhesive power and fastness to the action of cold. Furthermore, softening agents may be added.

Safety glass is, for instance, prepared by spreading the molten, softened or dissolved mass in a thin layer on two sheets of glass, superposing the two sheets and pressing them together at a raised temperature and under a moderate pressure, a formation of air bubbles between the sheets having to be avoided. After cooling, the sheets can immediately be cut and further be used.

Instead of glass other splintering materials, for instance enamel, porcelain or the like may be used. Also splinterless materials, such as metallic discs, can thus be united with splintering materials, such as glass.

The products obtaining by the new process are distinguished by a considerably reduced capability of splintering, while the other properties of the material in question are not unfavorably influenced. When so-called safety glass is made, the transparency, for instance, is by no means diminished.

The following examples serve to illustrate my invention, but they are not intended to limit it thereto, the parts being by weight:

(1) A mixture of 100 parts of acrylic acid ethyl ester and 86 parts of vinyl acetate is polymerized at a temperature of about 80° C. and 85° C. in the presence of about 0.2 part of an accelerating agent, for instance benzoyl peroxide. This polymerization product is spread in a finely pulverized form as uniformly as possible on a sheet of glass; a second sheet of glass is superposed and the whole is heated until the polymerization product has fused. Care has to be taken that no air bubbles are contained in the polymerization product. This is obtained by causing the pressure to set in in the middle of the glass plates and to spread to all sides. There is obtained a very resistant glass which, though prepared without an interposed film of cellulose, is extremely safe to splintering; a shock will produce cracks in the sheet without any risk of scattering injurious splinters.

(2) A mixture of 100 parts of acrylic acid ethyl ester and 150 parts of vinyl acetate is polymerized at a temperature of about 80° C. and 85° C. in the presence of a small quantity (about 0.2 part) of an accelerating catalyst. The polymerization product thus obtained is interposed in the form of a plastic film between two sheets of glass. These sheets of glass are heated and pressed together at a temperature of between 70° C. and 80° C. For ensuring adhesion of the film to the glass, the pressure is caused to set in in the middle of the glass plate and gradually to spread to the sides. There is obtained a very resistant glass which is extremely safe to splintering; a shock will produce cracks in the sheet without any risk of scattering injurious splinters.

(3) A mixture of 40 parts of vinyl chloride and 60 parts of vinyl acetate is polymerized at temperatures slowly rising from about 40° C. to about 80° C. while applying pressure. The polymerization product is applied in a finely reduced condition on 2 sheets of glass upon which the resin fuses when heated to a temperature of 120° C. and a clearly transparent layer is obtained. The resin layers of the two glass plates are superposed and the whole is pressed together at a temperature of 80° C. and under a pressure of 5 atmospheres; care has to be taken that no air bubbles are contained in the resin. A safety glass is obtained which is extremely resistant to shocks.

(4) A mixture of 150 parts of cinnamic acid methyl ester and 75 parts of vinyl acetate is polymerized at a temperature of about 80°–85° C. in the presence of a small quantity of an accelerating agent. The polymerization product thus obtained is heated to 130° C. and then caused to run on a pre-heated sheet of glass. The sheet of glass is heated until the mass has regularly spread on the whole plate. A second plate is superposed and the whole is pressed together when still warm. A safety glass of a high resistance is obtained.

(5) 20 parts of a resin which consists of 80 per cent. of a vinyl ester of a low viscosity and 20 per cent. of a condensation product obtained by heating castor oil and maleic anhydride, are dissolved in 40 parts of acetone and 40 parts of alcohol. The limpid solution is spread on two sheets of glass. When the solvent of a low boiling point has quickly evaporated at ordinary temperature without leaving any bubbles, the sheets are superposed with the film-sides and pressed together at 120° C. under a slight pressure.

(6) 5 parts of a condensation product from 1.3-butylene glycol and maleic anhydride are dissolved in 100 parts of a solution of 15 per cent. strength of polystyrene in benzene. This solution of lacquer is spread in a thin layer on two well cleaned sheets of glass. After evaporation of the benzene the sheets of glass are pressed together, while applying heat, as described in Example 5.

(7) 10 parts of a condensation product from 1.3-butylene glycol and maleic anhydride are introduced, while stirring, at 120° C. into 90 parts of a polyvinyl acetate which contains 20 per cent. of tributyl phosphate. This mass which is flowable in the heat spreads when applied on glass at a temperature of 120° C. so as to form a layer of 1–2 mm. thickness without forming any bubbles. Two glass plates with this layer of resin are superposed and then pressed in the heat and under a slight pressure.

In the following claims it is to be understood that the term "water-soluble polyvinyl compounds" is intended to cover products soluble in water and products capable of swelling in water:

I claim:

1. Splinterless glass consisting of two sheets of glass having interposed therebetween as a binding agent to secure adhesion of the glass sheets a product of the conjoint polymerization of vinyl acetate and acrylic acid ester.

2. A laminated object comprising at least one sheet of glass and a film comprising a polymer of a mixture of at least two unsaturated organic compounds.

3. A laminated object comprising at least one sheet of glass and a film comprising a polymer of a mixture of at least two unsaturated organic compounds whose polymers are elastic and transparent.

GEORG KRÄNZLEIN.